April 28, 1925.

R. KOENKE

FLASK PIN

Filed March 17, 1924

Inventor!
Reinhold Koenke.

Patented Apr. 28, 1925.

1,535,671

UNITED STATES PATENT OFFICE.

REINHOLD KOENKE, OF MILWAUKEE, WISCONSIN.

FLASK PIN.

Application filed March 17, 1924. Serial No. 699,822.

*To all whom it may concern:*

Be it known that I, REINHOLD KOENKE, a citizen of the United States, and resident of Milwaukee, in the county of Milwaukee and State of Wisconsin, have invented certain new and useful Improvements in Flask Pins; and I do hereby declare that the following is a full, clear, and exact description thereof.

This invention relates to molding flasks, and is particularly directed to flask pins.

In molding flasks a considerable loss both of material and time has been experienced due to the breaking off of the centering pins or dowel pins. These pins have been made integral with a bracket rigidly attached to one of the members, for instance, the drag, and adapted to be received in apertures formed in a bracket carried by the cope. When these flasks are separated and emptied they are handled very roughly and the pins are frequently broken off or distorted thus occasioning considerable loss of time and material.

This invention is designed to overcome the above noted defects, and objects of such invention are to provide dowel pins for flasks which are removable and are, therefore, not subjected to the stresses ordinarily imposed upon the dowel pins of flasks.

Further objects are to provide flasks with dowel pins so organized that they will take up the wear and insure exact alignment of the cope and drag, which may be readily applied, which may be securely attached, and which may be readily removed.

An embodiment of the invention is shown in the accompanying drawings, in which:—

Figure 2:
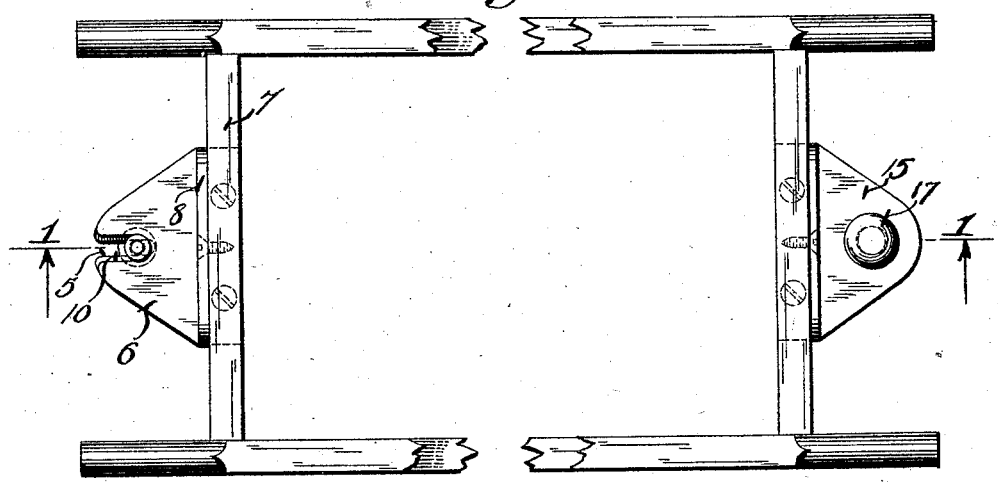
Figure 2 is a plan view of the structure shown in Figure 1.
Figure 3:
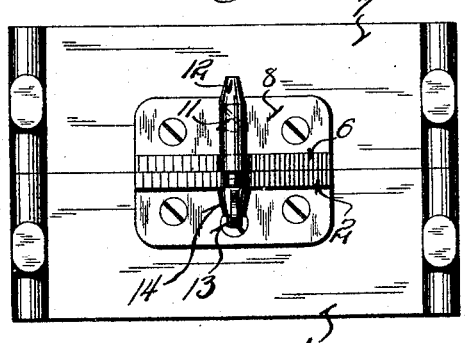
Figure 3 is an end view of the structure shown in Figure 1.

In practising this invention, one of the members, for instance the drag 1 is provided with a bracket 2 having a downwardly extending arm 3, and an inwardly extending arm 4 rigidly secured to the drag. The bracket 2 projects outwardly from the drag and is provided with a slot 5. A corresponding bracket 6 is secured to the cope 7 and is also provided with the arms 8 and 9 secured to the cope by spaced counter sunk screws in the preferred form. This bracket 6 is provided with a slot 10 of greater width than the slot 5, as may be seen from Figure 2. It is also to be noted that the slot 5 extends inwardly a greater distance than the slot 10.

Figure 1:
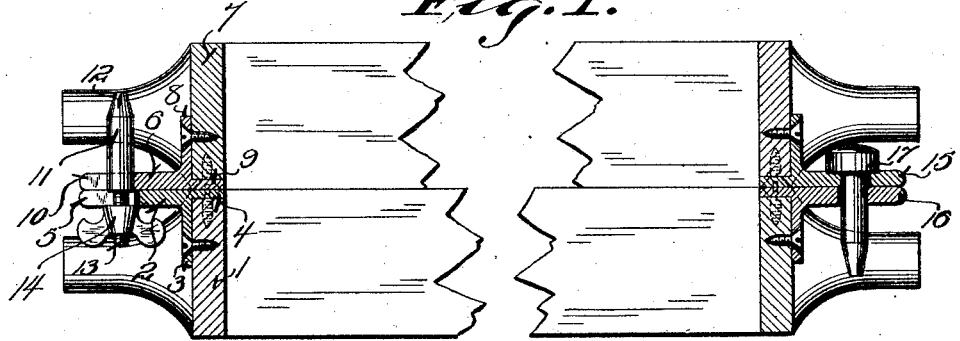
Figure 1 is a longitudinal sectional view through a flask equipped with a dowel pin, such view corresponding to a section on the line 1—1 of Figure 2.

The removable dowel pin comprises a cylindrical body portion 11 preferably provided with a tapered upper end 12 and provided with a threaded downwardly extending shank 13 of such size as to pass through the slot 5. A wing nut 14 is screwed upon the shank 13 and, when the pin is in position, clamps such pin to the lower bracket 2. As shown in Figure 1, the other side of the flask may be provided with any suitable type of interengaging fastening means such for instance as the brackets 15 and 16 and the removable, headed pin 17. It is, however, to be distinctly understood that, if desired, a construction similar to that first described, may be provided on this end of the flask also.

In using the dowel pins, they are adjusted inwardly until the cylindrical portions 11 abut the inner ends of the slots 10. Thereafter, the wing nuts are tightened and the pins locked in position. It will be seen, therefore, that as the slots 10, in the flasks, wear inwardly that the pins may be shifted inwardly, and may be clamped in their new adjusted position, thus taking up the wear.

After the pins have been used they may be removed and the flasks may, thereafter, be separated and emptied without danger of damage to such pins.

It will thus be seen that dowel pins have been provided which are not subjected to the rough usage ordinarily imposed upon such pins, which are removable, and which are adjustable to compensate for wear.

Although the invention has been described in considerable detail, it is to be understood that the invention may be variously embodied and is, therefore, to be limited only as claimed.

I claim:

The combination of a flask composed of separable members, each of said members having brackets with the brackets of one member located opposite the brackets of the other member, dowel pins cooperating with said brackets to align the members of the flask, one of said brackets having a narrow elongated slot and the opposed bracket having a wider and shorter slot, the dowel pin associated with the slotted brackets comprising a cylindrical body portion adapted to be positioned in said wider slot and having a reduced threaded portion adapted to be positioned in the narrow slot, and a clamping nut threaded upon said reduced portion.

In testimony that I claim the foregoing I have hereunto set my hand at Milwaukee, in the county of Milwaukee and State of Wisconsin.

REINHOLD KOENKE.